United States Patent
Wynn et al.

(10) Patent No.: US 8,196,188 B2
(45) Date of Patent: Jun. 5, 2012

(54) SYSTEMS AND METHODS FOR PROVIDING NETWORK CREDENTIALS

(75) Inventors: Simon Wynn, Redwood City, CA (US); John Gordon, Alameda, CA (US)

(73) Assignee: Devicescape Software, Inc., San Bruno, CA (US)

( * ) Notice: Subject to any disclaimer, the term of this patent is extended or adjusted under 35 U.S.C. 154(b) by 0 days.

(21) Appl. No.: 11/899,739

(22) Filed: Sep. 6, 2007

(65) Prior Publication Data
US 2008/0060065 A1    Mar. 6, 2008

Related U.S. Application Data

(60) Provisional application No. 60/824,756, filed on Sep. 6, 2006.

(51) Int. Cl.
*G06F 21/00* (2006.01)
(52) U.S. Cl. ............................ 726/5; 726/27; 713/186
(58) Field of Classification Search .................. 713/186; 726/5, 27, 6
See application file for complete search history.

(56) References Cited

U.S. PATENT DOCUMENTS

| | | | |
|---|---|---|---|
| 6,151,628 A | 11/2000 | Xu et al. | |
| 6,161,185 A | 12/2000 | Guthrie et al. | |
| 6,233,577 B1 * | 5/2001 | Ramasubramani et al. | 707/9 |
| 6,799,038 B2 | 9/2004 | Gopikanth | |
| 6,871,284 B2 * | 3/2005 | Cooper et al. | 726/1 |
| 6,961,857 B1 | 11/2005 | Floryanzia | |
| 7,360,087 B2 | 4/2008 | Jorgensen et al. | |
| 7,409,543 B1 | 8/2008 | Bjorn | |
| 7,437,755 B2 * | 10/2008 | Farino et al. | 726/5 |
| 7,457,950 B1 | 11/2008 | Brickell et al. | |
| 7,469,139 B2 | 12/2008 | van de Groenendaal | |
| 7,685,264 B2 | 3/2010 | Tumsi Dayakar et al. | |
| 7,920,531 B2 | 4/2011 | Gupta et al. | |
| 2001/0034837 A1 | 10/2001 | Kausik et al. | |
| 2002/0194501 A1 | 12/2002 | Wenocur et al. | |
| 2002/0199096 A1 | 12/2002 | Wenocur et al. | |
| 2003/0004994 A1 | 1/2003 | Kamrowski et al. | |
| 2003/0097592 A1 | 5/2003 | Adusumilli | |
| 2003/0188201 A1 | 10/2003 | Venkataramappa | |
| 2003/0204748 A1 | 10/2003 | Chiu | |
| 2003/0217137 A1 | 11/2003 | Roeses et al. | |
| 2004/0003060 A1 | 1/2004 | Asoh et al. | |

(Continued)

FOREIGN PATENT DOCUMENTS
WO    WO2005/096160    10/2005

OTHER PUBLICATIONS

Holtmanns et al., U.S. Appl. No. 60/818,517, filed Jul. 6, 2006, referenced in US 2008/0016230.*

(Continued)

*Primary Examiner* — Hadi Armouche
(74) *Attorney, Agent, or Firm* — Sheppard, Mullin, Richter & Hampton LLP

(57) ABSTRACT

Exemplary methods and systems for providing network credentials are described. An exemplary method includes receiving a credential request from a digital device over a network device, identifying a network record based on at least some information within the credential request, retrieving a network credential from a plurality of network credentials based on the network record, and transmitting a credential request response containing the network credentials from the plurality of network credentials to the digital device.

17 Claims, 9 Drawing Sheets

U.S. PATENT DOCUMENTS

| | | | |
|---|---|---|---|
| 2004/0003081 | A1 | 1/2004 | Justus |
| 2004/0031058 | A1 | 2/2004 | Reisman |
| 2004/0162818 | A1 | 8/2004 | Shaw |
| 2004/0168090 | A1 | 8/2004 | Chawla et al. |
| 2005/0066033 | A1 | 3/2005 | Cheston et al. |
| 2005/0097051 | A1 | 5/2005 | Madill, Jr. et al. |
| 2005/0144237 | A1 | 6/2005 | Heredia et al. |
| 2005/0177750 | A1 | 8/2005 | Gasparini et al. |
| 2005/0246431 | A1 | 11/2005 | Spitaels |
| 2005/0260973 | A1 | 11/2005 | Van de Groenendaal |
| 2006/0026289 | A1 | 2/2006 | Lyndersay et al. |
| 2006/0048213 | A1* | 3/2006 | Cheng et al. ................ 726/5 |
| 2006/0048214 | A1 | 3/2006 | Pennington et al. |
| 2006/0130140 | A1* | 6/2006 | Andreev et al. ............. 726/23 |
| 2006/0221919 | A1* | 10/2006 | McRae et al. ............. 370/338 |
| 2007/0011725 | A1 | 1/2007 | Sahay et al. |
| 2007/0019670 | A1 | 1/2007 | Falardeau |
| 2007/0054654 | A1 | 3/2007 | Jones |
| 2007/0073817 | A1 | 3/2007 | Gorty |
| 2007/0076612 | A1 | 4/2007 | Iyer et al. |
| 2007/0091861 | A1 | 4/2007 | Gupta et al. |
| 2007/0127423 | A1 | 6/2007 | Ho |
| 2007/0209065 | A1 | 9/2007 | Branam et al. |
| 2007/0256122 | A1 | 11/2007 | Foo et al. |
| 2007/0270129 | A1* | 11/2007 | Luo ........................ 455/414.1 |
| 2008/0016230 | A1* | 1/2008 | Holtmanns et al. ......... 709/229 |
| 2008/0060065 | A1 | 3/2008 | Wynn et al. |
| 2008/0225749 | A1 | 9/2008 | Peng et al. |
| 2009/0031125 | A1 | 1/2009 | Bjorn |
| 2009/0147792 | A1 | 6/2009 | Anschutz et al. |
| 2009/0222537 | A1 | 9/2009 | Watkins et al. |

OTHER PUBLICATIONS

Zündt et al. "Seamless Handoff in Community Based and Location Aware Heterogeneous Wireless Networks" 8th International Workshop on Mobile Multimedia Conference, Oct. 5-8, 2003, pp. 1-5, XP002281321.*

PCT International Search Report and Written Opinion dated Mar. 2, 2010 for International Application No. PCT/US2010/021409, 9 pages.

PCT International Search Report and Written Opinion dated Jul. 18, 2008 for International Application No. PCT/US2007/19464, 8 pages.

PCT International Search Report and Written Opinion dated Nov. 20, 2009 for International Application No. PCT/US2009/060532, 8 pages.

PCT International Search Report and Written Opinion dated May 21, 2008 for International Application No. PCT/US2007/19463, 7 pages.

PCT International Search Report and Written Opinion dated Dec. 3, 2008 for International Application No. PCT/US2008/78191, 7 pages.

PCT International Search Report and Written Opinion dated Dec. 8, 2008 for International Application No. PCT/US2008/78198, 10 pages.

Search Report and Written Opinion mailed Jun. 12, 2008 from International Serial No. PCT/US2007/019462 filed Sep. 6, 2007.

Office Action mailed Jul. 22, 2010 from U.S. Appl. No. 12/240,920, filed Sep. 29, 2008.

Office Action mailed Aug. 21, 2009 from U.S. Appl. No. 11/899,697, filed Sep. 6, 2007.

Office Action mailed May 12, 2010 from U.S. Appl. No. 11/899,697, filed Sep. 6, 2007.

Office Action mailed Sep. 1, 2010 from U.S. Appl. No. 11/899,638, filed Sep. 6, 2007.

Office Action mailed Jan. 14, 2011 from U.S. Appl. No. 11/899,697, filed Sep. 6, 2007.

Office Action mailed Apr. 7, 2011 from U.S. Appl. No. 11/899,697, filed Sep. 6, 2007.

Notice of Allowance mailed Nov. 4, 2011 from U.S. Appl. No. 11/899,697, filed Sep. 6, 2007.

Office Action mailed May 4, 2011 from U.S. Appl. No. 11/899,638, filed Sep. 6, 2007.

Office Action mailed May 9, 2011 from U.S. Appl. No. 12/240,969, filed Sep. 29, 2008.

Notice of Allowance mailed Nov. 10, 2011 from U.S. Appl. No. 12/240,969, filed Sep. 29, 2008.

Search Report mailed Feb. 10, 2011 from European Serial No. 07837822.1 filed Sep. 6, 2007.

Search Report mailed Apr. 4, 2011 from European Serial No. 0883372.7 filed Sep. 29, 2008.

Search Report mailed Apr. 1, 2011 from European Serial No. 08834360.3 filed Sep. 29, 2008.

Search Report mailed Feb. 10, 2011 from European Serial No. 07837824.7 filed Sep. 6, 2007.

Search Report mailed Feb. 10, 2011 from European Serial No. 07837823.9 filed Sep. 6, 2007.

Office Action mailed Mar. 23, 2011 from U.S. Appl. No. 12/240,920, filed Sep. 29, 2008.

* cited by examiner

| Location Identifier 402 | Sequence Identifier 404 | Signature 406 | DDID 408 | SSID 410 | Version Identifier 412 |

Credential Request 400

FIG. 4

SYSTEMS AND METHODS FOR PROVIDING NETWORK CREDENTIALS

CROSS-REFERENCE TO RELATED APPLICATIONS

The present application claims benefit of U.S. Provisional Patent Application No. 60/824,756 filed Sep. 6, 2006, and entitled "Network Credential Discovery Using DNS," which is hereby incorporated by reference. The present application is also related to co-pending U.S. patent application Ser. No. 11/899,697, entitled "System and Method for Acquiring Network Credentials," filed Sep. 6, 2007, and co-pending U.S. patent application Ser. No. 11/899,638, entitled "Systems and Methods for Obtaining Network Access," filed Sep. 6, 2007, both of which are incorporated by reference.

BACKGROUND

1. Field of the Invention

The present invention generally relates to accessing communication networks. More particularly, the invention relates to the automatic access of wireless communication networks.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology. Various cellular (e.g. GSM, CDMA and the like), Wi-Fi (i.e. IEEE 802.11), WiMAX (i.e. IEEE 802.16), and other technologies have enabled a wide range of access options for a potential network user. Many wireless access points or "hotspots" are accessible only with local geographic regions—in some cases as small as a specific business or other address. In addition, strategically placed hotspots may provide public or private network access for a diverse group of people.

The owners or managers of hotspots often require password and the like to enable user access. As a result, a user of multiple hotspots may have to store, remember, or otherwise manage a large number of passwords. Many users may store their passwords on a laptop computer they use to access the hotspot. However, not all devices capable of accessing hotspots are laptop computers; cellular phones, personal digital assistants (PDAs), and many other devices are now capable of wireless access. Unfortunately, users often cannot easily enter the password on the device or store the password within the device. For example, some devices capable of wireless access may not have a keyboard. Even when a device includes a keyboard, the keyboard is often small and may be of limited functionality, especially for users with limited finger dexterity.

When users store passwords on a laptop computer, the user must first access the laptop computer and store the correct password within the computer. When a password changes, the user is required to update the password within the computer. Additionally, having the username and password stored in the device presents a security problem should the device be lost or stolen.

Further, users are typically required to enter a password, username, and navigate a website to obtain network access. This process is time consuming and the user may enter the wrong information and be forced to re-enter data.

When users enter a password manually, they are less apt to remember difficult passwords. As a result, simple password access is susceptible to hacking and may compromise the user's network access, the hotspot, and/or the user's personal information. Moreover, the user's network access may be stolen if the user's simple password is hacked or simply guessed.

SUMMARY OF THE INVENTION

Exemplary methods and systems for providing network credentials for network access are described. The exemplary method comprises receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

The method may further comprise decrypting the credential request, authenticating the credential request, and encrypting the credential request response. Further, the method may also comprise retrieving an encryption key based on the digital device. The credential request may be received over a standard protocol of the network device. The standard protocol may be DNS.

The credential request may comprise a location identifier. The method may further comprise receiving a confirmed access response from the digital device.

An exemplary system for providing network credentials may comprise a credential request module and a credential request response module. The credential request module may be configured to receive a credential request from a digital device over a network device. The credential request response module may be configured to identify a network record based on at least some information within the credential request, retrieve a network credential from a plurality of network credentials based on the network record, and transmit a credential request response containing the network credential to the digital device.

An exemplary computer readable medium may have embodied thereon a program. The program may be executable by a processor for performing a method for providing network credentials. The method may comprise receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

BRIEF DESCRIPTION OF THE DRAWINGS

FIG. 4 is a block diagram of an exemplary credential request.

DETAILED DESCRIPTION OF THE INVENTION

Embodiments of the present invention provide systems and methods for providing network credentials. In exemplary embodiments, a credential server receives a request for network credentials from a digital device at a hotspot. The request may be formatted as a standard protocol which is relayed from the hotspot to the credential server. The credential server may identify a network record based on at least some information contained within the request and transmit network credentials associated with the network record to the digital device. The digital device may receive the network credentials and provide them to network device in order to obtain network access.

Figure 1:
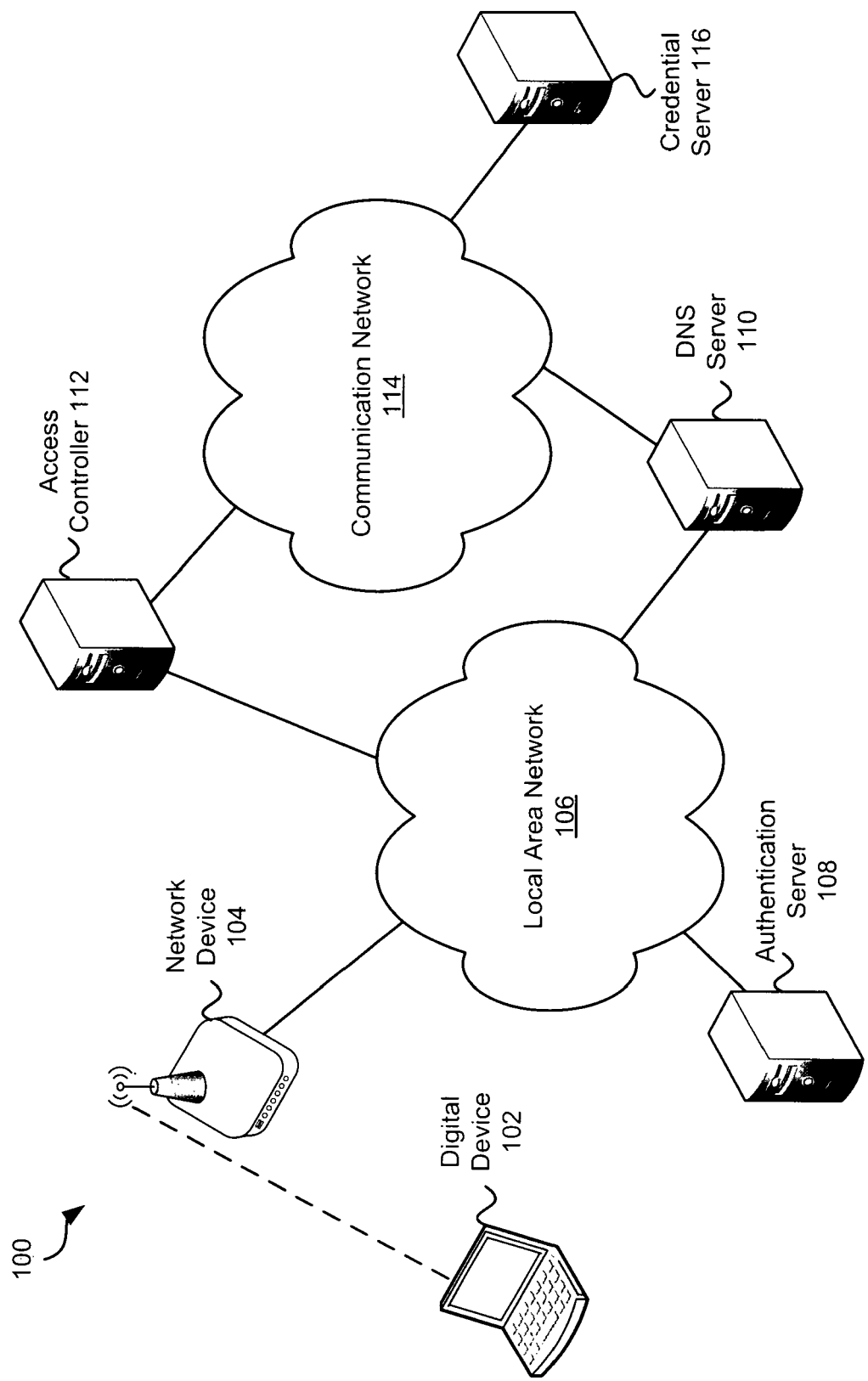
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access the communication network 114. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (e.g., such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request. More details regarding the process for acquiring network credentials are provided in co-pending U.S. patent application Ser. No. 11/899,697, entitled "System and Method for Acquiring Network Credentials," filed Sep. 6, 2007, and incorporated by reference herein.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password, and/or login procedure information. The login procedural information may comprise, for example, HTML form element names, a submission URL, or a submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server. More details regarding the process for obtaining network access are provided in co-pending U.S. patent application Ser. No. 11/899,638, entitled "System and Method for Obtaining Network Access," filed Sep. 6, 2007, and incorporated by reference herein.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
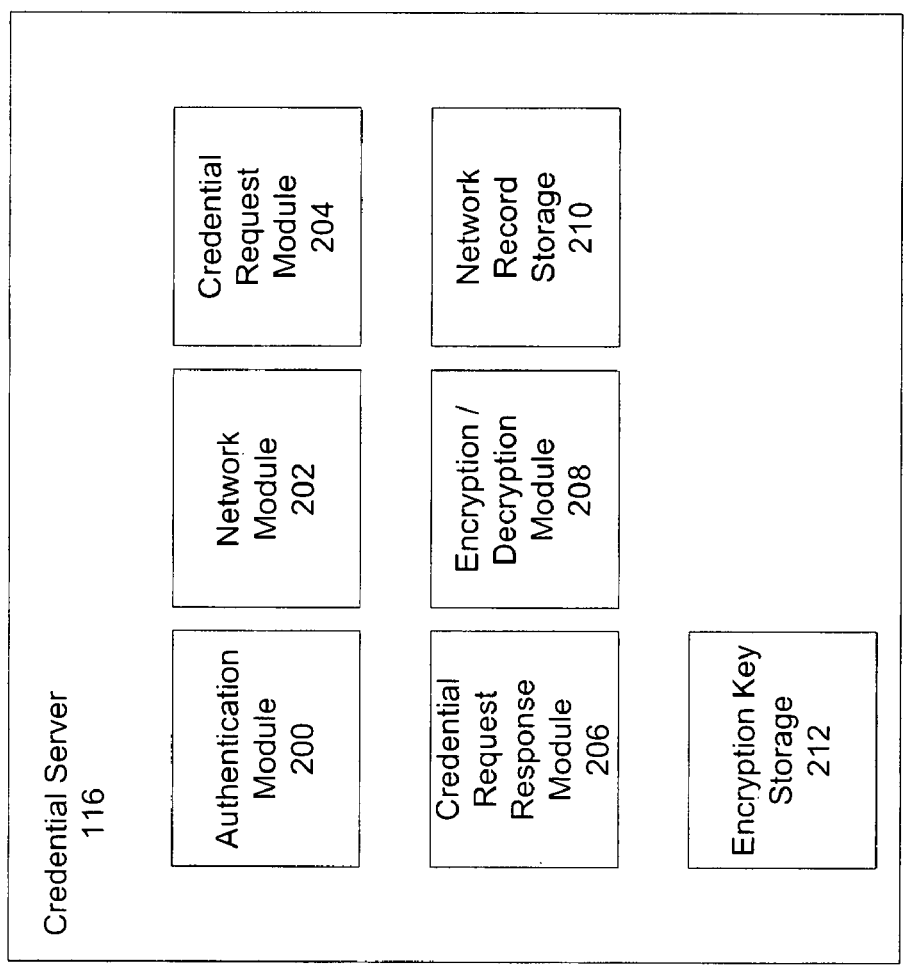
FIG. 2 is a block diagram of an exemplary credential server.

FIG. 2 is a block diagram of an exemplary credential server 116. The credential server 116 comprises an authentication module 200, a network module 202, a credential request module 204, a credential request response module 206, an encryption/decryption module 208, a network record storage 210, and an encryption key storage 212. A module may comprise, individually or in combination, software, hardware, firmware, or circuitry.

The authentication module 200 may be configured to authenticate the credential request and provide security to the credential request response. In various embodiments, the digital device 102 may encrypt or digitally sign the credential request using an encryption key (e.g., a shared encryption key or an encryption key that is a part of a key pair). The authentication module 200 may authenticate the credential request by decrypting the credential request with the proper encryption key retrieved from the encryption key storage 212. In one example, the digital device 102 generates a hash of the credential request and stores the hash within an encrypted portion of the credential request. The authentication module 200 may decrypt the credential request, generate hash of the credential request response, and compare the generated hash to the hash contained within the credential request for authentication.

In other embodiments, the digital device 102 may generate a nonce (i.e., a random value) and store the nonce within a portion of the credential request that is digitally signed. The authentication module 200 may decrypt the digital signature to authenticate the credential request and retrieve the nonce. In various embodiments, when the credential request response module 206 generates the credential request response (described hereafter), the authentication module 200 may include the nonce within the credential request response. The authentication module 200 or the encryption/decryption module 208 may then encrypt the credential request response. When the digital device 102 decrypts the credential request response, the digital device 102 may retrieve the nonce from the credential request response and compare the nonce to the nonce that was transmitted within the credential request for further authentication.

The network module 202 may be configured to receive the credential request and transmit the credential request response over the communication network 114.

The credential request module 204 may receive the credential request from the network module 202. The credential request may be a standard protocol. In one example, the credential request is a UDP protocol (e.g., DNS).

In exemplary embodiments, the credential request module 204 may retrieve the DDID and the SSID from the credential request. The DDID may identify the digital device 102, the user of the digital device 102, and/or the user associated with a network record. The SSID may identify the hotspot or the service provider (i.e., operator) of the hotspot.

The credential request module 204 or the credential request response module 206 may identify a network record based on the DDID and the SSID. A network record is a record associated (either directly or indirectly (e.g., a relational database)) with the DDID and the SSID. In one example, a network record contains network credentials necessary to provide network access to a digital device 102 associated with the DDID at the hotspot associated with the SSID. Network records may be stored within the network record storage 210.

The credential request response module 206 may generate the credential request response. In various embodiments, the credential request response module 206 receives the network credential associated with the DDID and SSID from the network record. In some embodiments, the network credential may comprise a credit card number. In one example, the digital device 102 receives the network credential, retrieves the credit card number, and provides the credit card number to the authentication server 108. In some examples, the authentication server 108 may then charge a fee to a credit card associated with the credit card number or use the information to confirm the identity of the user prior to granting network access.

Further, in various embodiments, the network credentials may comprise login procedural information. In one example, the credentials include a username and password which are to be provided within a form (e.g., an authentication form) retrieved from the authentication server 108 by the digital device 102. In some embodiments, the login procedural information may instruct the digital device 102 to populate specific fields within the form with the network credentials before submitting the completed form to the authentication server 108. Those skilled in the art will appreciate that there are many ways to provide credentials to the authentication server 108. The process of providing the credentials to the authentication server is further discussed in co-pending U.S. patent application Ser. No. 11/899,638, entitled "System and Method for Obtaining Network Credentials," filed Sep. 6, 2007.

The credential request response module 206 or the encryption/decryption module 208 may encrypt the credential request response with an encryption key associated with the DDID or the credential request. In one example, the credential server 116 stores one or more shared encryption keys. Each shared encryption key may be shared by at least one digital device 102. The credential request response module 206 may encrypt the credential request response with the shared encryption key associated with the digital device 102 (e.g., the shared encryption key may be associated with the DDID). The credential request response module 206 or the encryption/decryption module 208 may also encrypt the credential request with an encryption key that is part of a key pair. There may be many ways in which the encryption/decryption module 208 encrypts the credential request.

The encryption/decryption module 208 may decrypt the credential request and encrypt the credential request response. As previously discussed, the encryption/decryption module 208 may decrypt the digital signature of the credential request. In one example, the encryption/decryption module 208 decrypts the digital signature based on an encryption key that is associated with the DDID contained within the credential request. The encryption/decryption module 208 may also encrypt the credential request response. In one example, the encryption/decryption module 208 encrypts the credential request response based on an encryption key associated with the DDID (e.g., a shared encryption key or an encryption key that is part of a key pair).

In various embodiments, the encryption/decryption module 208 may encrypt the network records contained within the network record storage 210 and manage the encryption key storage 212. The encryption/decryption module 208 may also establish secure communications (e.g., via SSL and HTTPS) with a digital device when storing network credentials. This process is further described in FIG. 7. In accordance with some embodiments, the encryption/decryption module 208 may be optional.

The network record storage 210 and the encryption key storage 212 may store network records and encryption keys, respectively. The network record storage 210 and the encryption key storage 212 may comprise one or more databases. In one example, the network record storage 210 may store network records. A network record may comprise a DDID, SSID, and network credentials. The network record may also comprise a username and password for the user to access, alter, update, or store network records within the credential server 116.

In various embodiments, the network record may also allow multiple digital devices 102 to use the same network credentials. In one example, the user may own multiple digital devices 102. Multiple DDIDs, each DDID associated with a different digital device 102, may be included in the same network record. In some embodiments, multiple devices may be associated with one or more network records, and the one or more network records are associated with a user. As a result, the user may retrieve the network credentials for a hotspot using any number of digital devices 102. Those skilled in the art will appreciate that there are many ways in which the network records and/or the information contained therein may be stored and organized (e.g., different data structures, databases, records, organizing schemes, and/or methodologies).

Figure 3:
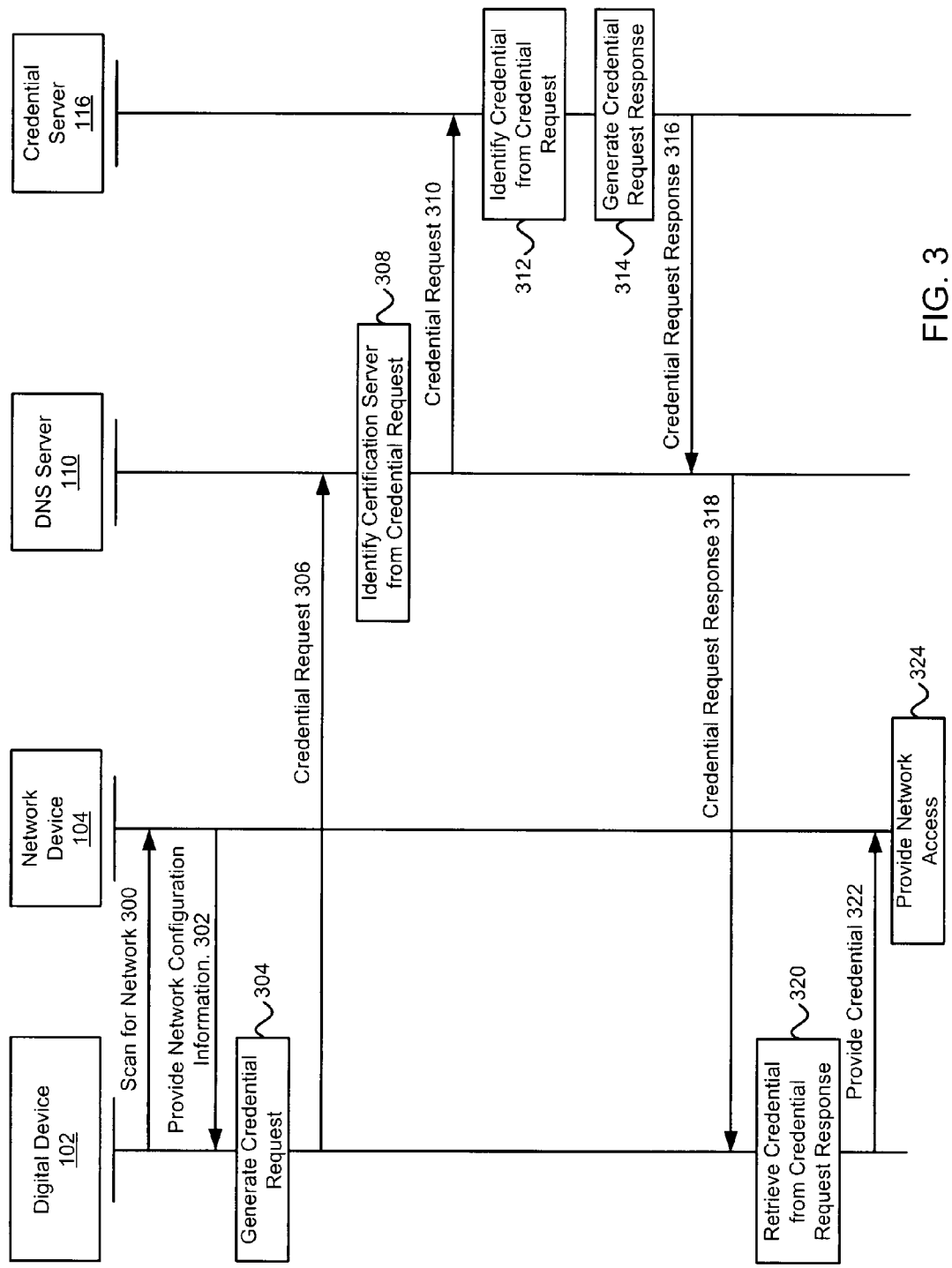
FIG. 3 is a flow diagram of an exemplary process for providing network access to the digital device.

FIG. 3 is a flow diagram of an exemplary process for providing network access to the digital device 102. When the digital device 102 first enters into a hotspot, the digital device 102 may scan for the local area network 106 in step 300. As a result of the scan, the network device 104 may provide network configuration information in step 302. The network configuration information may comprise one or more IP addresses for access to the DNS server 110.

In step 304, a credential request is generated by the digital device 102. Subsequently, the credential request may be sent to the DNS server 110 in step 306 using one of the IP addresses previously received from the network device 104.

Based on the credential request, the credential server 116 is identified by the DNS server 110 in step 308. In other embodiments, the DNS server 110 forwards the credential request to the credential server 116. When the DNS server 110 is unable to locally resolve the DNS request, the credential request is forwarded to another DNS server on the communication network 114 (e.g., over port 53) which may then forward the credential request to the credential server 116. The credential request is forwarded, either directly or indirectly through one or more other DNS servers on the communication network 114, to the credential server 116 in step 310.

The credential server 116 identifies the network credential needed based on the credential request in step 312. For example, the credential request may comprise an identifier (i.e., the DDID) for the digital device 102 as well as an identifier for the hotspot SSID (e.g., the service provider such as an operator). The identifiers may be compared against a table (e.g., network record) of such identifiers by the credential request module 204 or the credential request response module 206 to determine the proper network credential. A credential request response is then generated by the credential request response module 206 in step 314 and relayed back to the DNS server 110 in step 316. The DNS server 110 forwards the credential request response back to the digital device in step 318.

The digital device 102 may then retrieve the network credentials from the credential request response in step 320. The network credential may then be provided to the network device 104 in step 322. Upon verifying the network credentials, the network device 104 provides network access to the digital device 102 in step 324.

Referring now to FIG. 4, an exemplary credential request 400 is shown in more detail. According to exemplary embodiments, the credential request module 204 may generate the credential request 400. In one embodiment, the credential request 400 may be a DNS string having a structure that comprises a location identifier 402, a sequence identifier 404, a signature 406, the DDID 408, a service set identifier (SSID) 410, and a version identifier 412.

The optional location identifier 402 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 404 may comprise any number or set of numbers used to correspond to a subsequent request to the credential server 116 to determine if the login is successful. That is, the sequence identifier 404 provides a correlation mechanism by which verification of the login process may be made by the credential server 116.

In exemplary embodiments, the signature 406 comprises a cryptographic signature (i.e., digital signature) that is utilized to prevent spoofing. The signature 406 of the request from digital device 102 is verified by the credential server 116. If the signature 406 is not valid, then the request is rejected by the credential server 116.

The DDID 408 comprises an identifier of the digital device 102. For example, the DDID 408 may comprise a MAC address or any other identifier of the digital device 102.

The SSID 410 comprises an identifier of the network access point or Wi-Fi service provider. For example, the SSID 410 may comprise the name of the service provider or the name of the venue operating the network device 104.

The version identifier 412 may identify the protocol or format of the credential request 400. For example, a digital device 102 may generate the credential request 400 and organize the data in a number of different formats. Each different format may be associated with a different version identifier. In some embodiments, the components of the credential request response module 206 may be updated, reconfigured, or altered over time, which may affect the structure of the credential request 400. As a result, the credential server 116 may receive a plurality of credential requests 400 which are formatted differently. The credential server 116 may access the required information from each credential request based on the respective version identifier.

Figure 5:
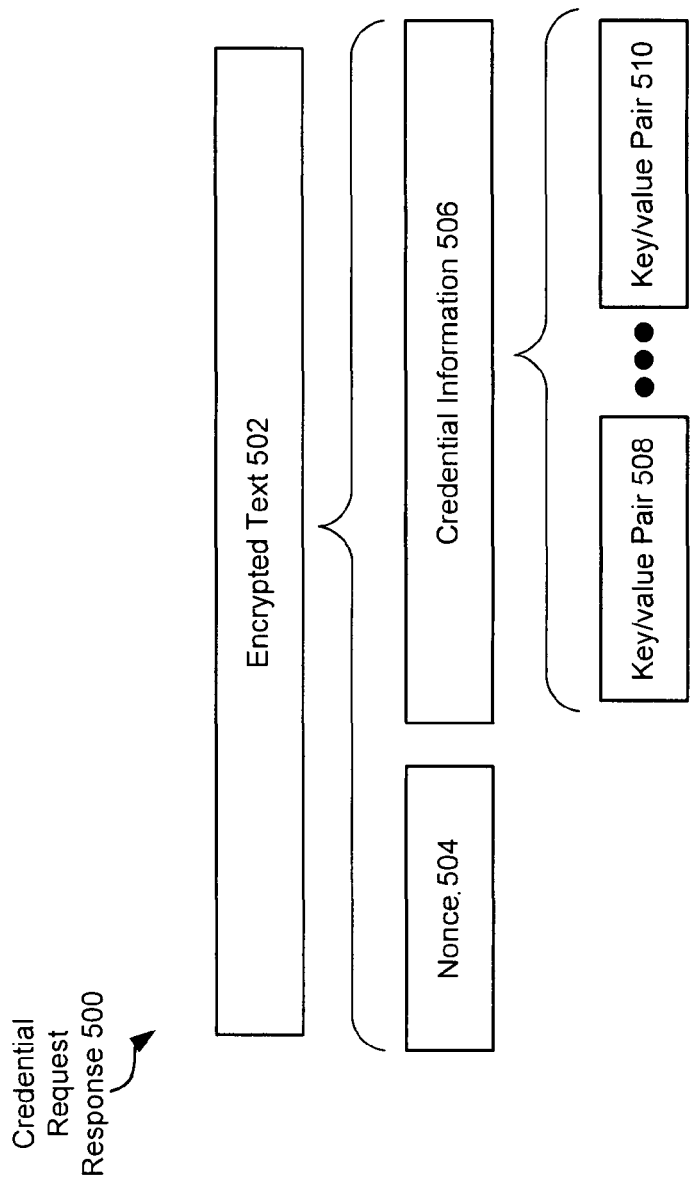
FIG. 5 is a block diagram of an exemplary credential request response.

FIG. 5 is a block diagram of an exemplary credential request response. According to exemplary embodiments, the credential request response module 206 may generate the credential request response 500. In one embodiment, the credential request response 500 may comprise encrypted text 502. The encrypted text may comprise an optional nonce 504 and credential information 506. The credential information may comprise key/value pairs 508 through 510.

As previously discussed, the credential request response may be formatted as a DNS response comprising encrypted text 502. The encrypted text 502 includes the network credentials (e.g., username, password, and login procedure information). Although the credential request response 500 is depicted as including encrypted text 502, the text within the credential request response 500 need not be encrypted.

The encrypted text 502 may comprise the nonce. The nonce, as previously discussed, may be retrieved from the credential request. Once the credential request response 500 is received by the digital device 102, the digital device 102 may compare the nonce within the credential request response 500 to the nonce transmitted within the credential request for authentication. Although the nonce is depicted as within the credential request response 500 in FIG. 5, the nonce is optional.

The credential information 506 may comprise a username, password, login procedure information, or a combination of these. The credential information 506 may comprise key/value pairs 508 through 510. Any number of key/value pairs may be within the credential information 506. The key/value pairs may represent the credential information to be received and translated by the digital device 102. The credential information 506 is depicted as key/value pairs for exemplary purposes only; the credential information may be within any format not necessarily limited to key/value pairs.

Figure 6:
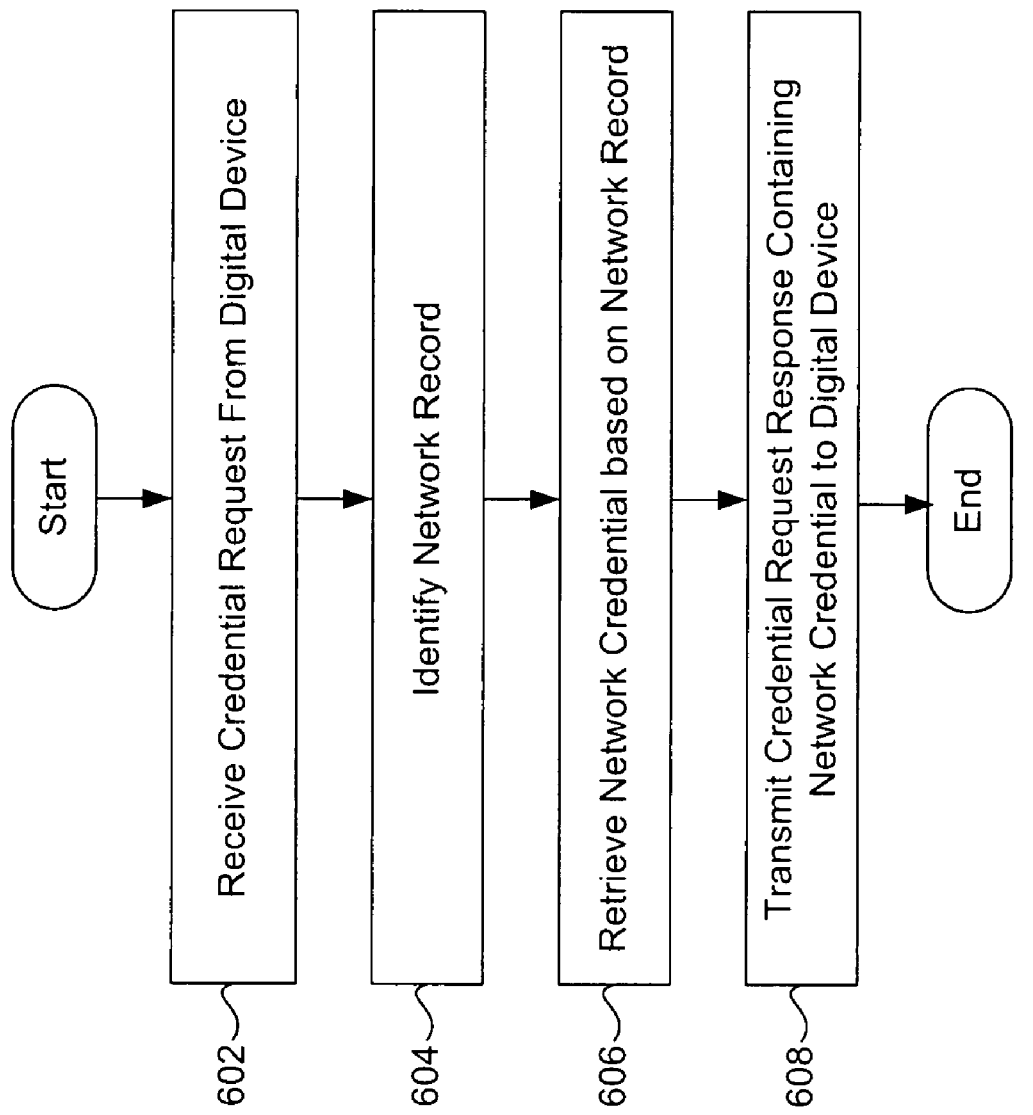
FIG. 6 is a flow diagram of the exemplary method for providing network credentials.

FIG. 6 is a flow diagram of the exemplary method for providing network credentials. In step 602, the credential server 116 receives the credential request from the digital device 102.

In various embodiments, the credential server 116 decrypts and authenticates the digital signature with an encryption key. The credential server 116 may then identify a network record based on the DDID and the SSID contained within the network record in step 604. In one example, the credential request response module 206 retrieves one or more network records associated with the DDID within the credential request. The credential request response module 206 then identifies at least one network credential associated with the SSID within the retrieved network record(s).

In step 606, the credential request response module 206 retrieves the identified network credential(s) from the selected network record. In one example, the credential request response module 206 identifies a username and password that the user of the digital device 102 must provide to the authentication server 108 to obtain network access. The credential request response module 206 generates the credential request response comprising the network credentials (e.g., username, password) to the digital device 102 in step 608.

In some embodiments, the credential request response module 206 may identify login procedural information as part of the network credentials. The credential request response module 206 may retrieve the login procedural information from the network record (e.g., the same network record containing a password associated with the SSID). The login procedural information may contain a form identifier and instructions (e.g., parameters) for the digital device 102 to follow to obtain network access. In one example, the digital device 102 retrieves the form identifier and instructions from the network credential within the credential request response. The digital device 102 may identify forms received from the authentication server 108 and input data based on the form identifier and instructions. In another example, the digital device 102 provides information to the authentication server 108 to obtain network access based on the login procedural information included within the credential request response. The process of providing information to the authentication server 108 is further described in U.S. patent application Ser. No. 11/899,638, entitled "Systems and Methods for Obtaining Network Access", filed Sep. 6, 2007.

Figure 7:
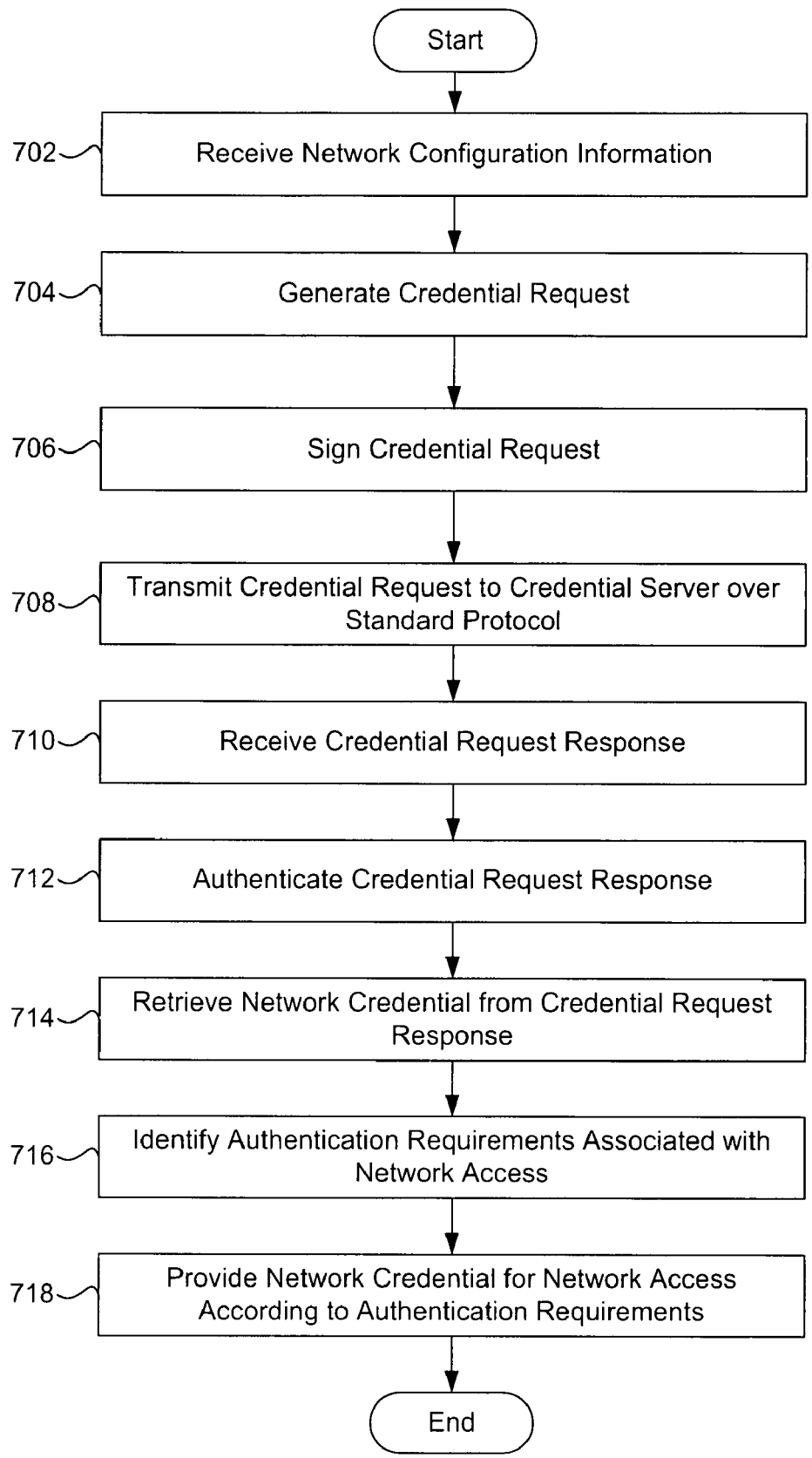
FIG. 7 is another flow diagram of the exemplary method for providing network credentials.

FIG. 7 is another flow diagram of the exemplary method for providing network credentials. The digital device 102 may search and find an available wireless network via the network device 104. While connecting to the hotspot, the digital device 102 may receive network configuration information in step 702. Network configuration information may comprise an identifier for the network device 104, or the DNS server 110. In one example, the digital device 102 receives a DNS server IP address (e.g., for the DNS server 110) during the connection process.

In step 704, the digital device 102 generates the credential request. The credential request may comprise a sequence identifier, DDID, and SSID. In step 706, the digital device 102 optionally generates a nonce and digitally signs the credential request with an encryption key. The digital device 102 transmits the credential request as a standard protocol in step 708. The network device 104 may receive and forward the credential request to the communication network 114. In various embodiments, the network device 104 may provide the credential request to the DNS server 110 which may forward the credential request to the credential server 116.

In exemplary embodiments, the credential request module 204 of the credential server 116 receives the credential request. The credential request module 204 may retrieve an encryption key associated with the DDID within the credential server from the encryption key storage 212. The credential request module 204 may then decrypt the digital signature of the credential request for authentication. The credential request module 204 may further retrieve the nonce and a sequence identifier from the credential request.

The credential request response module 206 of the credential server 116 may then retrieve a network record associated with the DDID and the SSID from the network record storage 210. The credential request response module 206 retrieves network credentials from the network record and generates the credential request response. The credential request response may comprise the network credentials and the nonce. The encryption/decryption module 208 may encrypt the credential request response with an encryption key associated with the DDID retrieved from the encryption key storage 212. In some embodiments, the credential request response is formatted as a standard protocol (e.g., DNS).

In step 710, the digital device 102 receives the credential request response. The digital device 102 subsequently authenticates the credential request response in step 712. In one example, the digital device 102 decrypts the credential request response with the same encryption key used to digitally sign the credential request. The digital device 102 may further retrieve the nonce within the credential request response and compare the nonce to the nonce transmitted within the credential request for further authentication. If the credential request response is found to be authentic, the digital device 102 retrieves the network credentials from the credential request response in step 714.

In step 716, the digital device 102 identifies the authentication requirements associated with network access. In various embodiments, the digital device 102 determines the correct information and network credentials to provide to the authentication server 108. In one example, the digital device 102 retrieves one or more network access pages from the authentication server 108. The digital device 102 may access the correct network access page from the authentication server and automatically make selections. In one example, the digital device 102 may automatically activate selections (e.g., activate buttons within the network access page, check boxes, and select radio buttons).

For example, the credential request response module 206 may provide instructions to the digital device 102 for the automatic selections within a network access page. As discussed herein, a network access page may comprise one or more web pages, one or more tags, or a combination of both retrieved from the authentication server 108. In one example, software within the digital device 102 may automatically check all selection boxes within a network access page. The digital device 102 may then uncheck select boxes based on the login procedure information. Those skilled in the art will appreciate that there may be many methods with which selections may automatically be made. In other embodiments, the digital device 102 receives XML tags from the authentication server 108. The digital device 102 may provide information based on the XML tags and instructions within the login procedural information to the authentication server 108 to obtain network access.

In step 718, the digital device 102 provides the network credential to the network device 104 to obtain network access to the communication network 114. In one example, the credential request response module 206 retrieves one or more forms from the authentication server 108, populates the forms with one or more network credentials, and provides the completed forms to the authentication server 108. In another example, the credential request response module 206 provides the network credentials as needed to the authentication server 108. Once the network credentials are received by the authentication server 108, the authentication server 108 may allow communication between the digital device 102 and the communication network 114. In one example, the authentication server 108 commands the access controller 112 to allow the digital device 102 access to the communication network 114.

The digital device 102 may subsequently test network connectivity to confirm network access. In one example, the digital device 102 transmits a request to the credential server 116 to determine if the communication network 114 is available. In some embodiments, the query or command contains the sequence identifier previously submitted within the credential request. If network access is successful, the credential server 116 may receive the request and retrieve the sequence identifier. The credential server 116 may then confirm that network access was successful.

Figure 8:
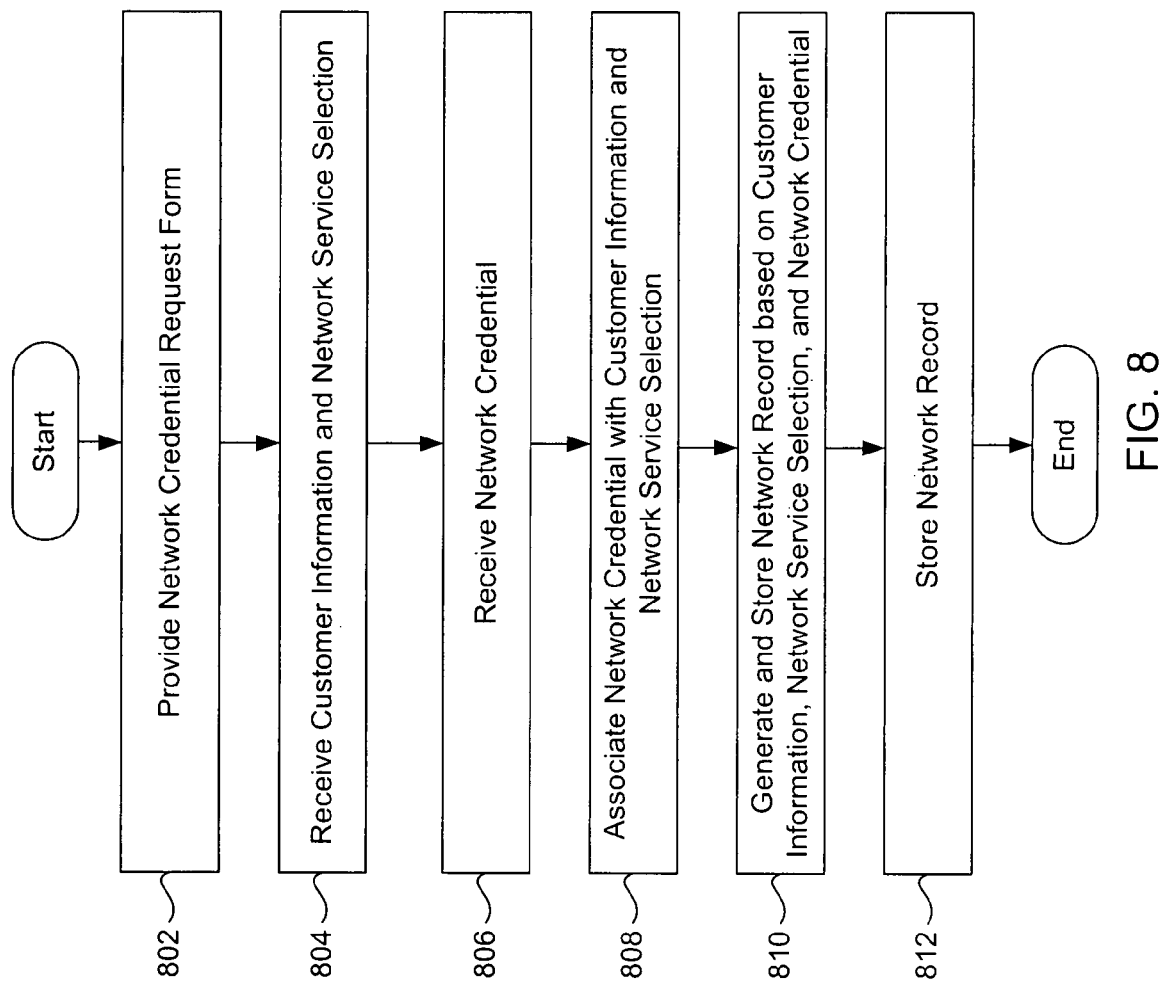
FIG. 8 is a flow diagram of an exemplary method for receiving and storing network credentials.

FIG. 8 is a flow diagram of an exemplary method for receiving and storing network credentials. In various embodiments, users may create and store network records within the credential server 116. For example, the credential server 116 may comprise a credential storage module (not depicted) that provides a graphical user interface (GUI) that allows users to create, store, update, remove, and modify network records.

In step 802, the credential server 116 provides the user with a network credential request form. In one example, the credential server 116 provides the network credential request form to a user as one or more web pages over the Internet. The network credential request form is configured to receive the service provider's name (e.g., operator's name) and/or SSID and network credentials.

The service provider's name may comprise the name of the entity that operates the hotspot, one or more components related to the hotspot (e.g., the network device 104), or the infrastructure of the local area network 106. In some embodiments, the service provider's name comprises the name of an organization that manages one or more hotspots for another service provider. In one example, a coffee shop and bookstore may both use a third-party manager to manage the hotspots, even if the hotspots have different service providers. In some embodiments, the network credential request form may be configured to receive the third-party manager's name. In some embodiments, the service provider's name comprises the name of an organization that resells access to a hotspot network (e.g., an aggregator).

The network credential request form may also receive the SSID as a network service selection. In one example, the network credential request form comprises a pull down menu of different service providers and/or hotspots that the user may select. For example, a user may select "Starbucks" or "San Francisco International Airport" as a hotspot. The user may be given further options to such as geographic locations of the hotspot. The user may also select the service provider. For example, the user may select "T-Mobile" as a service provider. The network credential request form may then allow the user to select among one or more various hotspots associated with T-mobile. The selection(s) may then be stored as a network record. Alternately, a network service identifier associated with the selection(s) is generated as the SSID.

Further, the network credential request form may receive the network credential from the user. For example, the user may enter a username, password, passcode as network credentials within the network credential request form. In some embodiments, after the network credential request form receives the SSID, the network credential request form determines the type of network credentials required. For example, the network credential request form identifies the information required to access a network at a hotspot at the San Francisco International Airport previously selected by the user. The network credential request form then generates fields or selections to allow the user to enter only the information necessary (e.g., username, password) to obtain network access at the hotspot.

The credential server 116 may also require the user to register prior to receiving the network credential request form. During registration, the user may be required to agree to terms of service and enter customer information. Customer information comprises a username and a password to access the credential server 116 to store network credentials. Optionally, the customer information may comprise the user's address, contact information, and payment options for the user to use services offered by the credential server 116.

In step 804, the credential server 116 receives the customer information and network service selections over the network credential request form. In step 806, the credential server may retrieve the network credential. In step 808 the credential server 116 receives the customer information. The credential server 116 associates the network credential with the customer information, network service selection and network credential(s) in step 810 to create a network record. The network record is then stored in step 812.

In some embodiments, the user may manually access the credential server 116 via the Internet. In other embodiments, the user may download and install network credential software on the digital device 102. The network credential software may identify and send the DDID of the digital device 102 to the credential server 116. In other embodiments, the network credential software may be pre-installed on the digital device 102. When the digital device 102 first activates the network credential software, the network credential software may identify and send the DDID of the digital device 102 to the credential server.

The user may input the SSID (e.g., identify the service provider or hotspots) into the network credential software. The user may also input the network credentials within the network credential software. After the network credential software has obtained the DDID, SSID, and network credentials, the network credential software may upload the information to the credential server 116 which stores the information within a network record. In various embodiments, the network credential software may be downloaded from the credential server 116.

Figure 9:
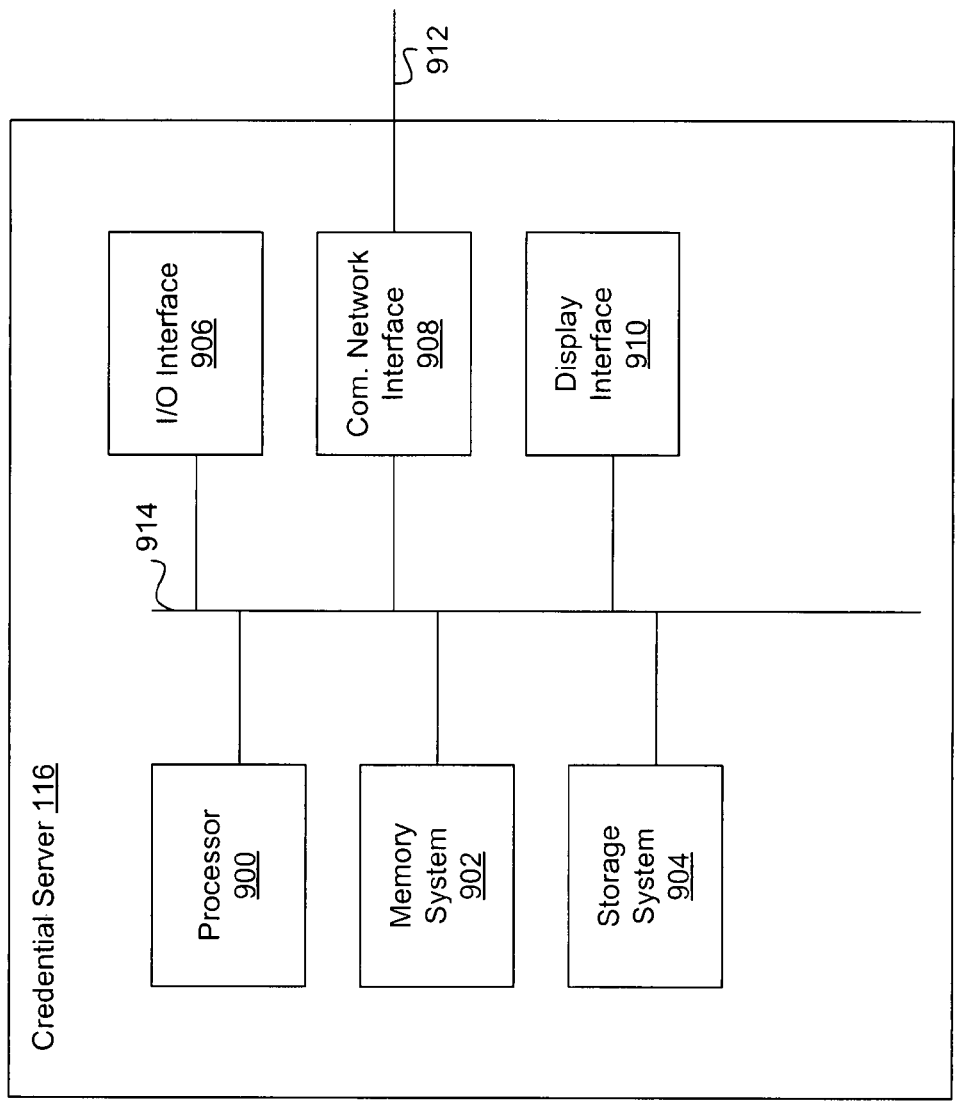
FIG. 9 is a block diagram of an exemplary credential server.

FIG. 9 is a block diagram of an exemplary digital device. The credential server 116 comprises a processor 900, a memory system 902, a storage system 904, an I/O interface 906, a communication network interface 908, and a display interface 910. The processor 900 is configured to execute executable instructions (e.g., programs). In some embodiments, the processor 900 comprises circuitry or any processor capable of processing the executable instructions.

The memory system 902 is any memory configured to store data. Some examples of the memory system 902 are storage devices, such as RAM or ROM. The memory system 902 can comprise the ram cache. In various embodiments, data is stored within the memory system 902. The data within the memory system 902 may be cleared or ultimately transferred to the storage system 904.

The storage system 904 is any storage configured to retrieve and store data. Some examples of the storage system 904 are flash drives, hard drives, optical drives, and/or magnetic tape. In some embodiments, the credential server 116 includes a memory system 902 in the form of RAM and a storage system 904 in the form of flash data. Both the memory system 902 and the storage system 904 comprise computer readable media which may store instructions or programs that are executable by a computer processor including the processor 900.

The optional input/output (I/O) interface 906 is any device that receives input from the user and output data. The optional display interface 910 is any device that is configured to output graphics and data to a display. In one example, the display interface 910 is a graphics adapter. It will be appreciated that not all digital devices 102 comprise either the I/O interface 906 or the display interface 910.

The communication network interface (com. network interface) 908 can be coupled to a network (e.g., the local area network 106 and communication network 114) via the link 912. The communication network interface 908 may support communication over an Ethernet connection, a serial connection, a parallel connection, or an ATA connection, for example. The communication network interface 908 may also support wireless communication (e.g., 802.11 a/b/g/n, WiMax). It will be apparent to those skilled in the art that the communication network interface 908 can support many wired and wireless standards.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for providing network credentials, the method comprising:

receiving a credential request from a digital device over a network device, the credential request comprising an identifier associated with the network device, the credential request requesting a network credential to be provided by the digital device to the network device;

identifying a network record based on at least the identifier associated with the network device;

retrieving the network credential from a plurality of network credentials based on the network record, the network credential comprising a user name; and transmitting a credential request response containing the network credential from the plurality of network credentials over the network device to the digital device, wherein the credential request is received over a standard protocol of the network device, the standard protocol being DNS.

2. The method of claim 1, further comprising decrypting the credential request.

3. The method of claim 1, further comprising authenticating the credential request.

4. The method of claim 1, further comprising encrypting the credential request response.

5. The method of claim 4, further comprising retrieving an encryption key based on the digital device.

6. The method of claim 1, wherein receiving the credential request comprises receiving the credential request over port 53 of the network device.

7. The method of claim 1, wherein the credential request comprises a location identifier.

8. The method of claim 1, further comprising receiving a confirmed access response from the digital device.

9. A system for providing network credentials, the system comprising:

a processor;

a credential request module executable by the processor, the credential request module configured to receive a credential request from a digital device over a network device, the credential request comprising an identifier associated with the network device, the credential request requesting a network credential to be provided by the digital device to the network device; and a credential request response module executable by the processor, the credential request response module configured to identify a network record based on at least the identifier associated with the network device, retrieve the network credential from a plurality of network credentials based on the network record, and transmit a credential request response containing the network credential over the network device to the digital device, the network credential comprising a user name, wherein the credential request is received over a standard protocol of the network device, the standard protocol being DNS.

10. The system of claim 9, further comprising an encryption/decryption module executable by the processor, the encryption/decryption module configured to decrypt the credential request.

11. The system of claim 9, further comprising an authentication module executable by the processor, the authentication module configured to authenticate the credential request.

12. The system of claim 9, further comprising an encryption/decryption module executable by the processor, the encryption/decryption module configured to encrypt the credential request response.

13. The system of claim 12, wherein the processor retrieves an encryption key from an encryption key storage based on the digital device.

14. The system of claim 9, wherein the credential request module configured to receive a credential request comprises the credential request module configured to receive the credential request over port 53 of the network device.

15. The system of claim 9, wherein the credential request comprises a location identifier.

16. A non-transitory computer readable medium having embodied thereon a program, the program being executable by a processor for performing a method for providing network credentials, the method comprising:
- receiving a credential request from a digital device over a network device, the credential request comprising an identifier associated with the network device, the credential request requesting a network credential to be provided by the digital device to the network device;
- identifying a network record based on at least the identifier associated with the network device;
- retrieving the network credential from a plurality of network credentials based on the network record, the network credential comprising a user name; and
- transmitting a credential request response containing the network credential from the plurality of network credentials over the network device to the digital device
- wherein the credential request is received over a standard protocol of the network device, the standard protocol being DNS.

17. The non-transitory computer readable medium of claim 16, wherein receiving the credential request comprises receiving the credential request over port 53 of the network device.

* * * * *